United States Patent [19]

Lau et al.

[11] Patent Number: 5,251,699
[45] Date of Patent: Oct. 12, 1993

[54] LOW-VISCOSITY GRAVEL PACKING PROCESS

[75] Inventors: Hon C. Lau; Louis A. Bernardi, Jr., both of Houston, Tex.

[73] Assignee: Shell Oil Company, Houston, Tex.

[21] Appl. No.: 888,092

[22] Filed: May 26, 1992

[51] Int. Cl.$^5$ .............................................. E21B 43/04
[52] U.S. Cl. .................................................... 166/278
[58] Field of Search ........................... 166/278, 276, 50

[56] References Cited

U.S. PATENT DOCUMENTS 5,027,899  7/1991  Grubert ............................... 166/278
5,058,677  10/1991  Forrest ................................. 166/278

FOREIGN PATENT DOCUMENTS

0040445A1  11/1981  European Pat. Off. .

OTHER PUBLICATIONS

ACS Symposium Series 396 "Oil Field Chemistry—Enhanced Recovery and Production Simulation" by A. J. Clarke-Sturman et al., Chapter 8, pp. 157–168, 1989.

"Succinoglycan: A New Biopolymer for the Oil Field", A. J. Clarke-Sturman et al. from Symposium on Advanced Oil Field Chemistry presented before the Division of Petroleum Chemistry, Inc., ACS, Toronto.

SPE Publication #20681, "Horizontal Gravel Packing Studies in a Full-Scale Model Wellbore", J. K. Forrest, 1990.

*Primary Examiner*—Stephen J. Novosad
*Attorney, Agent, or Firm*—Del S. Christensen

[57] ABSTRACT

An improved gravel packing process is provided in which a gravel pack slurry is thickened with succinoglycan and the slurry further comprises an amount of breaker effective to result in 80 percent settlement of sand from the slurry after a time period larger than about one hour and shorter than about three hours.

16 Claims, No Drawings

LOW-VISCOSITY GRAVEL PACKING PROCESS

FIELD OF THE INVENTION

This invention relates to an improved process to gravel pack a wellbore.

BACKGROUND TO THE INVENTION

When oil is produced from unconsolidated or poorly consolidated formations, migration into the wellbore of loose sand and erosion from sandstone is a constant problem. This migration of sand may eventually clog flow passages in the production system of the well and can erode downhole and surface equipment. In some instances, the clogging of the production system may lead to complete cessation of flow, or "killing" of the well.

Sand migration is typically controlled by placement of a gravel pack around a slotted liner or a wire-wrapped screen. For simplicity, the slotted liner or wire-wrapped screen will be referred to herein as a "liner". The "gravel" used in such a gravel pack is typically a sand of a size which is large enough to be kept out of the production liner or screen, but small enough to prevent migration of formation sand past the gravel pack and into the production facilities.

A gravel pack is generally placed by first inserting the liner in the portion of the wellbore to be packed. The wellbore may be either cased or uncased. The wellbore is generally cased in poorly consolidated or unconsolidated formations. A "crossover" tool is positioned on top of the liner. The crossover tool and liner are suspended from a workstring. The crossover tool allows a slurry of sand in a carrier fluid to be pumped down a workstring to the crossover tool, and then be routed through the crossover tool to the volume surrounding the liner. The sand is deposited both within this volume and the perforations. In a circulating gravel pack, some of the liquid carrier of the gravel pack slurry enters the liner where it can communicate through on to the annulus surrounding the workstring and be returned to the surface. The rest of the fluid leaks out to the formation through the perforations. The percentage of the carrier fluid which returns to the surface is referred to as the return rate. A packer is placed above the liner in the annulus surrounding the crossover tool to prevent the slurry around the liner from bypassing the liner and communicating directly to the annulus around the workstring. After the sand is deposited around the liner and in the perforations, the crossover tool is disconnected from the liner and lifted out of the wellbore. A production tubing is then lowered into the wellbore and connected to the liner.

A slurry which is relatively viscous will carry sand into perforations effectively, but will not result in a good gravel packing in the annulus surrounding the liner. A less viscous carrier fluid such as water without a thickener is effective in packing the annulus around the liner, but is not effective to carry gravel into perforations. J. K. Forrest, in "Horizontal Gravel Packing Studies in a Full-Scale Model Wellbore," SPE paper 20681, and in U.S. Pat. No. 5,058,677, suggests a two stage gravel packing process to accomplish packing of both perforations and the wellbore. A hydroxyethyl cellulose (HEC) containing slurry is used to pack the perforations and about 75% of the liner-casing annulus. A slurry that does not contain a thickener is then used to complete the gravel pack. For best results, the HEC containing slurry was followed by a "HEC post pad." This process therefore requires many steps resulting in a complicated and time consuming gravel packing process.

The use of thickeners such as HEC in the concentrations known in the prior art requires a breaker to reduce the viscosity of the slurry and allow settlement of sand after the slurry is placed in the wellbore. Most breakers reduce the viscosity of the slurry at a rate that is strongly dependent upon temperature and the amount of shear to which the slurry is exposed. It is difficult to control timing of the preparation of the breaker containing slurry, injection into the wellbore and slurry temperature. A relatively slowly acting breaker is therefore used to ensure that the breaker does not reduce the viscosity of the slurry too quickly, resulting in the sand prematurely settling from the slurry, or "sanding out" prior to placement in the wellbore and perforations. It would be preferable to utilize slurries that do not require the use of breakers.

A useful polysaccharide for imparting viscosity to gravel pack slurries is succinoglycan. This polymer and its properties are disclosed in, for example, ACS Symposium Series 396 "Oil Field Chemistry—Enhanced Recovery and Production Simulation" by A. J. Clarke-Sturman, et al. Chapter 8, pp 157-168; "Succinoglycan: A New Biopolymer for the Oil Field" by A. J. Clarke-Sturman, et al. from Symposium on Advanced Oil Field Chemistry presented before the Division of Petroleum Chemistry, Inc. ACS, Toronto Meeting, Jun. 5-11, 1988; and European Patent Application 0,040,445. These polymers impart a high and relatively temperature insensitive viscosity to an aqueous composition below the polymers, transition temperature. As the transition temperature is exceeded, the viscosity imparted to an aqueous mixture by these polymers decreases markedly. The transition temperatures may be adjusted to a certain extent by addition of various modifiers, as disclosed in Great Britain Patent Application No. 902 6596.8 and the A. J. Clark-Sturman articles cited above.

It is therefore an object of the present invention to provide a process to gravel pack a wellbore that is effective at packing both the wellbore and perforations. It is also an object to provide such a process that is accomplished using the same gravel pack slurry to pack both the perforations and the wellbore. In another aspect it is an object of the present invention to provide a slurry capable of packing both the perforations and the wellbore. It is also an object to provide such a process and such a slurry that are effective to pack perforated deviated wellbores.

SUMMARY OF THE INVENTION

These and other objects are accomplished by a process comprising the steps of:
a) perforating the section of the wellbore;
b) inserting a gravel packing tool and a screen into the section of the wellbore;
c) injecting into the section of the wellbore surrounding the screen a gravel pack slurry comprising a carrier fluid, a thickener in an amount sufficient to impart a viscosity to the carrier fluid of between about two and about ten centipoise at a shear rate of about 100 sec$^{-1}$ at the temperature of the wellbore, and between about one-half and about five pounds of gravel pack sand per gallon of carrier fluid; and d) returning through the screen about 20 to about 85 percent of the carrier fluid and thereby leaving a gravel packed wellbore and perforations surrounding the screen.

The slurry of the present invention comprises:
a carrier fluid;
a thickener in an amount sufficient to impart a viscosity to the slurry of between about two and about ten centipoise at a shear rate of about 100 sec$^{-1}$ at the temperature of a wellbore to be gravel packed, and;
between about one and about five pounds of gravel pack sand per gallon of slurry and a carrier fluid.

The relatively low viscosity slurry of the present invention has been found to be effective to carry gravel pack sand into perforations even in highly deviated wellbores, i.e., 45° to 90° from vertical. No breaker is required due to a reasonable settling rate of the sand from the slurry.

A preferred polysaccharide is a succinoglycan. Succinoglycan can be prepared as a very clean hydrated liquid which greatly expedites slurry preparation. Further, succinoglycan has very desirable temperature-viscosity characteristics. Other suitable thickeners include xanthan gum and hydroxyethyl cellulose.

DETAILED DESCRIPTION OF THE INVENTION

Placement of sand around a production liner to prevent formation sand from penetrating into the liner involves suspension of the liner from a crossover tool and drill string within the wellbore. The crossover tool provides communication from the inside of the drillstring to the wellbore surrounding the liner. The crossover tool also typically provides communication for return fluid from within the liner to the annulus surrounding the workstring. The wellbore above the crossover tool surrounding the workstring and the wellbore surrounding the liner below the crossover tool are typically separated by a packer associated with the crossover tool.

After the liner is suspended in the wellbore within the portion of the wellbore which is to be packed, a slurry of sand of is pumped through the workstring, crossover and into the annulus surrounding the liner. The sand is of a narrow size range selected so it is retained by the screen, but small enough to retain formation sand. Sand that passes through a 40 mesh screen but not a 60 mesh screen, or 40×60 mesh sand, is often utilized. Other sand pipes commonly used include 20×40 and 50×70. Typically, 0.5 to 5 pounds of sand are suspended in each gallon of carrier fluid. A sand-carrier ratio of about one-half to about three pounds per gallon of slurry is preferred and about three pounds per gallon is particularly preferred.

The liner contains slots which are sufficiently narrow to prevent passage of this sand to within the liner. The carrier fluid can pass into the liner through the slots and then pass through the crossover tool to the annulus surrounding the drill pipe. Similarly, a wire wrapped screen has wires wrapped around the pipe separated by distances equivalent to the width of the slots. After this sand is placed around the liner, the sand is allowed to settle for at least about one hour. The crossover tool is then disconnected from the liner and lifted out of the wellbore. A production tubing is then placed in the wellbore and connected to the liner. The low viscosity slurry results in rapid settlement without the need for a polymer breaker, but delays settlement enough to permit movement of settled but still fluidized sand into perforations. Water slurries, in contrast, can pack an annulus well, but the sand compacts quickly and may not have sufficient time to flow into and completely pack the perforations.

The slurry containing the sand must be viscous enough to suspend the sand and prevent the sand from quickly "sanding out", or dropping from the slurry prematurely. This viscosity is preferably very shear-thinning and insensitive to variations in temperature. Shear-thinning results in the slurry being pumpable in spite of being sufficiently viscous to maintain sand particles in suspension. Insensitivity to changes in temperature prevents sanding out due to the slurry increasing in temperature as the slurry passes through the drill pipe.

A thickener is added to the carrier fluid of the present invention sufficient to impart a viscosity of between about 2 and about 10 centipoise at a shear rate of about 100 sec$^{-1}$ at the temperature of the wellbore to be packed. A typical prior art polysaccharide slurry will be of a viscosity of about 100 centipoise at wellbore temperature, and contain about 15 pounds of sand per gallon of carrier fluid. Water has a viscosity of about one centipoise at any shear rate at room temperature. At typical well bore temperature, viscosity of water becomes a fraction of a centipoise. Acceptable thickeners include: polysaccharides such as xanthan gum and succinoglycans; and natural polymers and their derivatives such as carboxymethyl cellulose, hydroxyethyl cellulose, and carboxymethylhydroxyethyl cellulose. These thickeners are commercially available and well known in the art.

Succinoglycan is a biopolymer capable of imparting these useful properties to sand slurries. Succinoglycan solutions display viscosities which are, below the succinoglycan's transition temperature, much more temperature insensitive than other polymers. Succinoglycan solutions are additionally more shear-thinning than polymers commonly used as viscosifier.

Succinoglycan is a heteropolysaccharide comprising glucose and, for each 7 moles of glucose, 0.9 to 1.2 moles of galactose and 0.65 to 1.1 moles of pyruvate, together with succinate and acetate in molar proportions (for each 7 moles of glucose) between 0 and 2.

A particularly preferred commercially available succinoglycan is SHELLFLO-S, available from Shell International Chemical Company Limited, Shell Centre, London SE1 7PG, England. This succinoglycan is relatively free of solids and is supplied as a prehydrated liquid. Slurry preparation of a job site is significantly simplified by the use of a prehydrated liquid viscosifier.

At room temperature, about two to four pounds of active succinoglycan per thousand gallons will impart a viscosity of about 2 to 10 centipoise to a carrier fluid. At higher wellbore temperatures, somewhat more succinoglycan is required. Other thickeners are generally less effective than succinoglycan, and more is therefore preferred. About three to eight pounds of active xanthan gum per thousand gallons of carrier fluid are required to provide such a viscosity. Even higher concentrations of hydroxyethyl cellulose are required.

The thickeners of the present invention provide an additional significant advantage in that they significantly reduce the hydraulic pressure drop in the workstring when compared to either water based slurries or prior art high viscosity slurries. The slurries of the present invention will generally stay in a laminar flow regime to a much higher flow rate than less viscous slurries. Significantly greater flexibility therefore exists to operate at higher slurry pump rates when wellhead or slurry pump discharge pressures are limited. The carrier fluid of the present invention may be fresh water, sea water, or completion brine.

To achieve a good gravel packing of both the annulus surrounding the screen and the perforations, carrier fluid must be leaked both into the formation and into the screen. The percent of the carrier fluid which is returned to the surface through the screen is generally referred to as the return rate. This return rate is preferably between about 20 and about 85 percent. It is more preferably between about 50 to about 70 percent to achieve both good annular and perforation packing.

The optimum velocity of the slurry in the annulus between the screen and the casing or wellbore wall before any leak-off occurs depends upon the angle from vertical of the wellbore being packed. Generally, higher velocities are preferred for more horizontal wellbores than for more vertical wellbores. For a horizontal wellbore, the slurry velocity, before any leakoff, between the screen and the casing or wellbore is preferably about 2 to 3 feet per second. A wellbore that is about 45° to 0° from vertical is preferably packed with a slurry velocity of about one to two feet per second prior to leak-off. A wellbore at about 64° from vertical is preferably packed with a slurry velocity of about two feet per second.

EXAMPLES

The present invention was demonstrated using a full-scale wellbore model. The model was a 30 foot long, 6 inch internal diameter transparent casing with 18 feet of perforations spaced at 12 perforations per foot at 90 degree phasing A 2⅜ inch, 6 gauge screen and a 1.66 inch OD washpipe were within the casing. Perforations were blocked for the middle six foot section of the casing to mimic a section of casing with no leak off. A two foot section between the end of the well and the bottom of the screen did not have perforations. A three foot blank section was provided above the screen.

Most of the perforations were modeled by 0.7 inch ID tubes with a resin-coated sand core at the end of the tube to simulate the formation face. To enable observation of perforation unloading, some of the 0.7 inch tubes were replaced with larger transparent cylinders. The cylinders were 2 13/16 inch ID tubes that were 5 9/16 inches long, with similar resin coated sand cores to simulate the formation face.

Sands of 50×70 or 40×60 mesh were suspended in slurries of water or succinoglycans according to the ratios listed in Table 1. Slurries were pumped into the annulus between the screen and the casing at a rate resulting in the slurry velocities listed in Table 1, and carrier fluids were permitted to exit from the wash pipe at rates resulting in the return rates listed in Table 1.

When succinoglycans were incorporated in the slurries, the succinoglycan was SHELLFLO-S, available from Shell International Chemical Company Limited, Shell Centre, London, England. The amount of succinoglycan listed in Table 1 is active succinoglycan.

Twenty six tests were performed to determine perforation packing as percent of perforation volume, unloading of perforations on production and the annular packing. Annular packing was observed for sections across perforations, the blank section between perforations, and the blank section below the screen. Unloading of perforations on production was reported quantitatively when the unloading was extensive enough to permit a quantitative estimate.

Perforations pointing upward were open except for six tests. Generally, horizontal wells are not perforated upward due to the possibility of formation sand falling in and plugging the perforation or wellbore. Four tests, 14 through 17, were performed with hole angles from vertical or 64° to 90° with upper perforations open. These tests demonstrate that even upward perforations could be packed with the low-viscosity slurry of the present invention, but not with a water only slurry pack.

Tests 16 through 26 were performed with at least one variable outside of the ranges of the present invention. Tests 16, 17, 20, 21 and 22 did not contain thickener. These tests generally packed the annulus very well, but not the perforations. Test 23 contained too much succinoglycan. Annular packing was poor, and upon production, sand migrated from the perforations and filled voids in the annulus.

Tests 18 and 19 were performed at about 90 percent return rate. Test 19, with 40×60 mesh sand, did not result in sufficient perforation packing. Test 18, with 20×40 mesh sand resulted in an incomplete annular pack.

Test 24 was performed with a lower slurry velocity than that preferred for packing a horizontal wellbore. The resultant pack had less than optimum annulus packing.

Test 25 was performed at a higher slurry velocity than that preferred for deviated well. The resultant annular packing was loose and nonuniform in the section of the wellbore between the open perforations.

Test 26 was performed at a higher gravel loading than that preferred for the present invention, and resulted in a perforation packing that substantially unloaded upon production.

The foregoing description of the invention is merely intended to be explanatory thereof, and various changes in the details of the described method and apparatus may be made within the scope of the appended claims without departing from the spirit of the invention.

TABLE 1

| Test No. | Hole deg from vertical | succino-glycan lb/1000 gal | ppg gravel | Gravel size mesh × mesh | Maximum Slurry velocity ft/sec | Return Rate % | Perf. Pack % Lower | Upper | Annular Packing Across Perfs | Middle Section | Below Screen | Perforation Unloading on Production |
|---|---|---|---|---|---|---|---|---|---|---|---|---|
| 1 | 45 | 4 | 3 | 50 × 70 | 1.3 | 70 | 100 | | good | good | void | little |
| 2 | 45 | 4 | 3 | 50 × 70 | 1.3 | 50 | 75 | | good | good | void | little |
| 3 | 45 | 4 | 3 | 50 × 70 | 1.3 | 25 | 70 | | good | loose | void | little |
| 4 | 45 | 4 | 1 | 50 × 70 | 1.3 | 70 | 100 | | good | good | small void | little |
| 5 | 90 | 4 | 3 | 50 × 70 | 2.5 | 75 | 100 | | good | good | void | little |
| 6 | 45 | 2 | 3 | 50 × 70 | 1.3 | 70 | 95 | | good | good | packed | none |

TABLE 1-continued

| Test No. | Hole deg from vertical | succino-glycan lb/1000 gal | ppg gravel | Gravel size mesh × mesh | Maximum Slurry velocity ft/sec | Return Rate % | Perf. Pack % Lower | Upper | Annular Packing Across Perfs | Middle Section | Below Screen | Perforation Unloading on Production |
|---|---|---|---|---|---|---|---|---|---|---|---|---|
| 7 | 45 | 4 | 3 | 50 × 70 | 1.3 | 70 | 100 | | good | good | void | little |
| 8 | 45 | 3 | 3 | 50 × 70 | 1.3 | 70 | 95 | | good | good | void | little |
| 9 | 0 | 2 | 3 | 50 × 70 | 1.3 | 70 | 100 | | good | good | void | little |
| 10 | 45 | 2 | 3 | 50 × 70 | 1.3 | 70 | 87 | | good | good | packed | none |
| 11 | 64 | 2 | 3 | 40 × 60 | 1.9 | 50 | 100 | | good | good | small void | little |
| 12 | 64 | 1 | 3 | 40 × 60 | 1.9 | 50 | 100 | | good | good | void | not available |
| 13 | 64 | 2 | 3 | 40 × 60 | 1.3 | 50 | 100 | | good | small channel | void | none |
| 14 | 64 | 2 | 3 | 40 × 60 | 1.9 | 50 | 100 | 100 | good | good | void | little |
| 15 | 90 | 2 | 3 | 40 × 60 | 1.9 | 50 | 100 | 70 | good | small channel | void | 35% empty |
| 16 | 64 | 0 | 3 | 40 × 60 | 1.9 | 50 | 100 | 53 | good | good | void | 33% empty |
| 17 | 64 | 0 | 1 | 40 × 60 | 1.9 | 50 | 100 | 48 | good | good | void | 12% empty |
| 18 | 64 | 2 | 3 | 20 × 40 | 1.9 | 90 | 95 | | good | channel | void | none |
| 19 | 64 | 2 | 3 | 40 × 60 | 1.9 | 90 | 40 | | channel | good | void | none |
| 20 | 64 | 0 | 3 | 40 × 60 | 1.9 | 50 | 100 | | good | good | void | substantial |
| 21 | 90 | 0 | 3 | 40 × 60 | 2.5 | 75 | 18 | | good | very good | packed | none |
| 22 | 45 | 0 | 3 | 40 × 60 | 2.5 | 75 | 10 | | good | very good | packed | little |
| 23 | 45 | 8 | 3 | 50 × 70 | 1.3 | 70 | 50 | | good | loose | void | substantial |
| 24 | 90 | 4 | 3 | 50 × 70 | 1.3 | 70 | 60 | | good | loose | void | little |
| 25 | 45 | 4 | 3 | 50 × 70 | 2.5 | 70 | 100 | | good | loose | void | substantial; exposed screen |
| 26 | 45 | 4 | 5 | 50 × 70 | 1.3 | 70 | 100 | | good | good | void | substantial |

We claim:

1. A process to provide a gravel packed section of a wellbore comprising the steps of:
   a) perforating the section of the wellbore;
   b) inserting a gravel packing tool and a screen into the section of the wellbore;
   c) injecting into the section of the wellbore surrounding the screen a gravel pack slurry comprising a carrier fluid, a thickener in an amount sufficient to impart a viscosity to the carrier fluid of between about two and about ten centipoise at a shear rate of about 100 sec$^{-1}$ at the temperature of the wellbore, and between about one-half and about five pounds of gravel pack sand per gallon of carrier fluid; and
   d) returning through the screen about 20 to about 85 percent of the carrier fluid and thereby leaving a gravel packed wellbore and perforations surrounding the screen.

2. The process of claim 1 wherein the thickener is succinoglycan.

3. The process of claim 2 wherein the amount of succinoglycan in the gravel pack slurry is between about two and about eight pounds per thousand gallons of carrier fluid.

4. The process of claim 3 wherein the amount of succinoglycan in the gravel pack slurry is between about two and about four pounds per thousand gallons of carrier fluid.

5. The process of claim 1 wherein the gravel pack slurry is injected at a rate that results in an initial slurry velocity of between about 1 ft/sec and about 3 ft/sec in the section of the wellbore surrounding the screen.

6. The process of claim 1 wherein the amount of gravel pack sand in the gravel pack slurry is between about 0.5 and about 5 pounds per gallon of carrier fluid.

7. The process of claim 1 wherein the thickener is xanthan gum and the xanthan gum in the gravel pack slurry is between about 3 and about 12 pounds per thousand gallons of carrier fluid.

8. The process of claim 1 wherein the section of the wellbore is deviated at an angle of between about 45 and about 90 degrees from vertical.

9. The process of claim 1 wherein the gravel pack slurry does not contain a breaker.

10. The process of claim 1 wherein the gravel pack sand is selected from the group consisting of 20×40 mesh, 40×60 mesh and 50×70 mesh sand.

11. A gravel pack slurry comprising a carrier fluid; a thickener in an amount sufficient to impart a viscosity to the carrier fluid of between about two and about ten centipoise at a shear rate of about 100 sec$^-$ at the temperature of the wellbore; and between about one-half and about five pounds of gravel pack sand per gallon of carrier fluid.

12. The gravel pack slurry of claim 11 wherein the thickener is a succinoglycan.

13. The gravel pack slurry of claim 12 wherein the amount of succinoglycan is between about two and about four pounds per thousand gallons of carrier fluid.

14. The gravel pack slurry of claim 13 wherein the amount of gravel pack sand in the gravel pack slurry is between about 0.5 and about 5 pounds per gallon of carrier fluid.

15. The gravel pack slurry of claim 13 wherein the gravel pack slurry does not contain a breaker.

16. The gravel pack slurry of claim 13 wherein the gravel pack sand is selected from the group consisting of 20×40 mesh, 40×60 mesh and 50×70 mesh sand.

* * * * *